United States Patent
Williams et al.

[19]

[11] Patent Number: 5,974,489
[45] Date of Patent: *Oct. 26, 1999

[54] COMPUTER BUS EXPANSION

[75] Inventors: Emrys John Williams, Milton Keynes; Paul Jeffrey Garnett, Merseyside, both of United Kingdom

[73] Assignee: Sun Micro Systems, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/769,146

[22] Filed: Dec. 18, 1996

[51] Int. Cl.⁶ ........................................... G06F 13/00
[52] U.S. Cl. ..................... 710/102; 710/101; 710/103
[58] Field of Search .................. 395/281, 282, 395/283, 822, 857, 309; 326/86; 710/101, 102, 103

[56] References Cited

U.S. PATENT DOCUMENTS

| | | | |
|---|---|---|---|
| 5,058,004 | 10/1991 | Ravid | 395/822 |
| 5,134,617 | 7/1992 | McRoy | 371/29.1 |
| 5,202,965 | 4/1993 | Ahn et al. | 395/283 |
| 5,268,592 | 12/1993 | Ballamy et al. | 307/43 |
| 5,274,769 | 12/1993 | Ishida | 395/851 |
| 5,491,804 | 2/1996 | Heath et al. | 395/827 |
| 5,586,271 | 12/1996 | Parrett | 395/283 |
| 5,802,328 | 9/1998 | Yoshimura | 395/282 |
| 5,805,903 | 9/1998 | Elkhoury | 395/750.01 |

FOREIGN PATENT DOCUMENTS

| | | |
|---|---|---|
| 266016 | 5/1987 | European Pat. Off. . |
| 632393 | 1/1995 | European Pat. Off. . |
| 811932 | 12/1997 | European Pat. Off. . |
| 3938018 | 5/1990 | Germany . |
| WO9315459 | 8/1993 | WIPO . |

*Primary Examiner*—Ayaz R. Sheikh
*Assistant Examiner*—Rupal D. Dharia
*Attorney, Agent, or Firm*—Park & Vaughan LLP

[57] ABSTRACT

An arrangement is provided whereby an expansion card can be inserted in a multi-contact computer backplane connector and then gates provided between bus lines and respective connector contacts can be enabled. Hot insertability of the card and improved fault protection results. A plurality of gate signals for respective connectors can be provided so that a bus controller can selectively supply a gate signal for enabling transmission gates of only one connector for a given bus cycle, thereby providing dynamic cycle switching of the cards. The transmission gates can be provided in a backplane connector for a card. Preferably, a power supply signal is supplied to a switch gate connected between a power line and a power contact of the connector when a card has been inserted in a connector such that power is only supplied to the card only after insertion. A bus request signal can be enabled after a predetermined delay following the supply of power to the card.

12 Claims, 4 Drawing Sheets

COMPUTER BUS EXPANSION

BACKGROUND AND INTRODUCTION

This invention relates to managing an expandable computer bus architecture.

Open system architectures are well known in computer systems. Open computer system architectures are based on the provision of a computer bus which can be expanded by means of expansion cards. In order to provide for computer bus expansion, on a typical backplane, or motherboard, a computer bus will be provided with a number of sockets into which expansion cards can be inserted. There are a number of different standards for computer bus expansions. One conventional standard is the PCI (Peripheral Component Interface) architecture. The PCI architecture enables a bus to be expanded by the insertion of cards, but the standard PCI architecture is less than ideal for a highly reliable system for a number of reasons. Firstly, PCI cards are not hot replaceable, meaning that the cards cannot be inserted when the system is actually running. Accordingly, it is necessary to turn off the main computer system in order to carry out maintenance and insert new cards. Also, it is difficult to tell exactly which card might be generating a fault which can be identified on the bus. Accordingly, this increases maintenance and repairs costs where a fault develops. A further difficulty of PCI cards is the limitation placed on the size of the system which can be produced due to the bus trace length limit for signal propagation. This is a particular problem if easy maintenance is to be enabled. Reliable and easily maintained systems may demand a configuration of bus paths which results in particularly long signal paths. This limits the physical size of the system which can be manufactured due to transmission line factors.

SUMMARY OF THE INVENTION

It is an aim of the present invention to address at least some of the above identified problems of conventional bus systems.

In accordance with one aspect of the invention, there is provided a backplane for a computer system, the backplane having at lest one multi-contact connector for expansion cards, at least one bus line for connection to a predetermined contact of the connector(s), a gate connecting the bus line to a predetermined contact, and a gate signal line for supplying a gate signal to the gate.

The provision of a gate between the bus line and the connector contact enables control of the input/output to a card inserted or to be inserted in the connector.

Thus, the contact can be enabled selectively, for example continuously from some predetermined time or for a particular bus cycle. This control provides a basis for enabling hot insertion and removal of a card for a running system, in that the appropriate contacts can be disabled, preventing bus errors and card malfunctions. Also, where a PCI bus controller on the backplane is to be provided, standard cold-insertable PCI cards can be used.

Preferably, a respective gate signal line is provided for each of a plurality of connectors, whereby selective control of the gates for respective connectors can be provided. This further enables dynamic cycle switching of the cards to be achieved.

Preferably, the bus comprises at least a plurality of data lines for connection to respective data contacts of a connector, a respective transmission gate (preferably implemented by a pair of FETs—field effect transistors) being provided between each data line and the respective contact of the connector, thereby enabling selective gating of the data and address signals to and from a connected card. For a multi-connector system, a respective gate signal line can be provided for each of a plurality of connectors, with the gate signal being supplied in parallel to each transmission gate of a connector. Alternatively, a plurality of gate signal lines can be provided for a connector so that individual transmission gates can be enabled at timings selected for the lines concerned.

Preferably also, at least one power line is provided for connection to a power contact of the connector(s), a switch gate (preferably implemented by an FET) being connected between the power line and the power contact of a connector and a power signal line for supplying a power control signal to control the switch gate. This enables the selective application of power to the card following correct insertion of the card.

Preferably, also, at least one bus request line is connected to a bus request contact of a connector and a bus request gate for selectively passing the bus request signal from the bus request connector to the bus request line. Preferably, the bus request gate is operable in use to pass a bus request signal only after a predetermined delay following power being supplied to a card connected to the connector. In this way, it is possible to allow for the circuits of card to settle after application of power to the card, avoiding transients and other false signals from disrupting the operation of a computer system incorporating the backplane.

The gate signal line can be implemented using a strobe line common to each connector, the strobe line being active, in use, as the gate line when a radial address signal on a radial address signal line for the connector is active.

In accordance with another aspect of the invention, there is provided a multi-contact connector for the connection of an expansion card to a computer backplane, the connector comprising a gate electrically connected in-line between a connector pin for connection to a line on a backplane and a contact for connection to a corresponding contact on an inserted expansion card, a gate signal input of the gate being electrically connected to a connector pin for connection to a gate signal line.

Preferably, a plurality of transmission gates (each preferably implemented by a pair of FETs) are provided, each electrically connected in-line between a respective connector pin for connection to a line on a backplane and a respective contact for connection to a corresponding contact on an inserted expansion card. Respective gate signal inputs for each of transmission gates are electrically connected to a common connector pin for connection to a gate signal line.

Preferably, the connector also comprises a switch gate (preferably implemented by an FET) electrically connected in-line between a connector pin for connection to a power line on a backplane and a contact for connection to a corresponding power contact on an inserted expansion card, a control input of the switch gate being electrically connected to a connector pin for connection to a power signal line.

In accordance with a further aspect of the invention, there is provided a computer system comprising a backplane, at least one multi-contact connector on the backplane for expansion cards, at least one bus line on the backplane for connection to a predetermined contact of the connector(s), a gate connecting the bus line to a predetermined contact, a gate signal line for supplying a gate signal to the gate, and a bus controller connected to the bus line for data transmission and connected to the gate signal line for supplying a gate signal for the gate.

Preferably, a respective gate signal line is provided for each of a plurality of connectors, the bus controller selectively supplying gate signals for enabling the gates.

Preferably, the bus comprises at least a plurality of data lines for connection to respective data contacts of a connector, a respective transmission gate being provided between each data line and the corresponding contact of the connector. In this case, a respective gate signal line is preferably provided for each of a plurality of connectors, the bus controller selectively supplying a gate signal in parallel to each transmission gate of only one connector for a given bus cycle for enabling the transmissions gates of the connector for the given bus cycle whereby dynamic cycle switching can be provided.

Preferably also, at least one power line is provided for connection to a power contact of the connector(s), a switch gate connected between the power line and the power contact of a connector, a power signal line for supplying a power control signal to control the switch gate of the connector, wherein the bus controller selectively applies a power control signal on the power control signal line when a card has been inserted in the connector.

Preferably, also, at least one bus request line connected to a bus request contact of a connector and bus request gate for selectively passing the bus request signal from the bus request contact. More preferably, the bus request gate is operable in use to pass a bus request signal only after a predetermined delay following power being supplied to a card connected to the connector.

In a preferred embodiment of the invention, the bus controller comprises an address decoder providing geographic decoding of address signals for respective cards, whereby the bus controller can determine in advance the source of a response to any bus cycle before the bus cycle commences.

Where the bus is a PCI bus, the provision of geographic addressing enables conventional PCI cards to be used with the significant advantage that isolation of faults in a particular PCI card is facilitated. Indeed, in accordance with a further aspect of the invention, there is provided a method of configuring a PCI bus mechanism to provide geographic addressing of cards connected to the bus, whereby the bus controller can determine in advance the source of a response to any bus cycle before the bus cycle commences. Geographic addressing in a PCI context overcomes the difficulty of prior PCI implementations in which the isolation of faults on a PCI bus is difficult and time consuming. As the bus controller can determine in advance the source of a response to any bus cycle before the bus cycle commences, the location of a faulty card can be readily identified.

In accordance with a further aspect of the invention, there is provided a method of connecting an expansion card to a backplane of a computer system, the method comprising steps of: inserting an expansion card into a multi-contact connector for the expansion card; and subsequently enabling a gate provided between a bus line and a connector contact by supplying a gate signal on a gate signal line to the gate. The method can include the hot-insertion of the card into the multi-contact connector.

To facilitate fault isolation and to reduce transmission line problems, the bus controller preferably supplies a gate signal for enabling the transmission gates of only one connector for a given bus cycle.

The method can include a further step between the insertion step and the enabling step of: supplying a power supply signal to a power switch connected between a power line and a power contact of the connector when the card has been inserted in the connector, whereby power is supplied to the card only after insertion, thereby providing dynamic cycle switching.

The method can also include a further step after the step of supplying a power signal of: enabling a bus request signal to be passed from a bus request contact of the connector only after a predetermined delay following the supply of power to the card. These further steps facilitate the insertion of the card when the computer is system is live.

A method of an embodiment of the invention employs geographic addressing by a bus controller to cards connected to the computer system, whereby the bus controller can determine in advance the source of a response to any bus cycle before the bus cycle commences.

DESCRIPTION OF THE DRAWINGS

Exemplary embodiments of the present invention will be described hereinafter with reference to the accompanying drawings in which like reference signs are applied to like elements and in which.

DESCRIPTION OF THE PREFERRED EMBODIMENT

Figure 1:
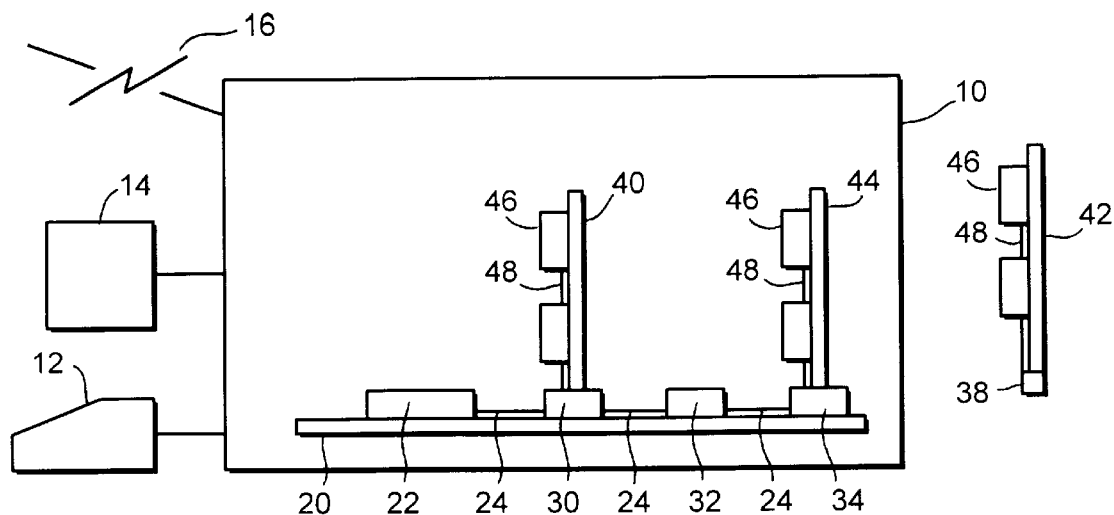
FIG. 1 is a schematic cross section of a computer system showing a backplane and a number of expansion cards.

FIG. 1 is a schematic cross-section of a computer system 10, which comprises of a backplane, or motherboard, or main board 20. Although reference is made hereinafter to a "backplane", it should be understood that the reference to a backplane is intended to relate to a board or other carrier plane on which at least one bus is provided, and to which at least one expansion, or additional card can be connected via a connector, or socket.

In FIG. 1, a bus controller 22 is represented schematically on the backplane 20. The bus controller 22 is connected via a bus 24 to a plurality of sockets, or connectors, 30, 32 and 34. Each of the connectors 30, 32 and 34 is provided with a plurality of contacts for making contact with corresponding contacts on an insertable card. In FIG. 1, two cards 40 and 44 are shown inserted in the connectors 30 and 34, respectively. The individual cards 40 and 44 are provided with electronic circuits and or other components 46 which are connected by printed circuit or other wiring 48 to connectors provided at one edge of the card, either directly at the edge on the card or by means of a separate connector (not shown). It will be noted that the connector 32 is not populated in FIG. 1. A further card, 42 could also be inserted in the connector 32 to expand the computer system 10. FIG. 1 also illustrates the card 42 provided with circuits 46, connected by printed circuit wiring 48 to an edge connector 38.

In order to avoid having to turn off the computer system 10 in order to be able to insert the card 42, it would be desirable to be able to hot insert the card 42. In accordance with an embodiment of the present invention, this would be possible as will be described hereinafter.

Figure 2:
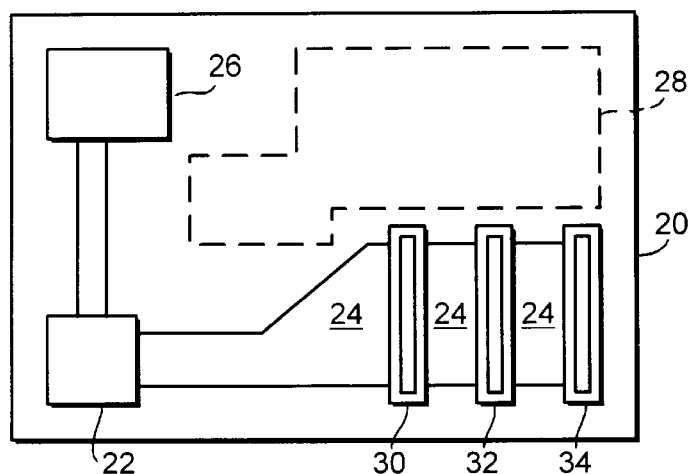
FIG. 2 is a schematic plan view of the backplane of FIG. 1.

FIG. 2 is a schematic plan view of the backplane 20 illustrated in side view in FIG. 1. FIG. 2 is a schematic diagram showing only those components relevant to the description of the present invention. In addition to the components shown in FIG. 1, and identified by like reference numerals, FIG. 2 schematically shows a processor 26 connected to the bus controller 22 and schematically shows additional circuitry 28.

It will be appreciated that the computer system 10 can include any normal configuration of a computer system with additional circuitry including timing circuitry, control circuitry, data storage devices, etc. Also, as shown schematically in FIG. 1, data entry and output devices such as a keyboard 12 and display 14 can form part of the computer system 10, as can a connection to a network 16, etc. Some of the connections to external devices such as a display 14, or an external network, can be provided by means of the circuitry on one of the insertable cards, or alternatively such interfaces can be provided from the backplane circuitry 28 in a manner which will be immediately apparent to one skilled in the art.

Figure 3:
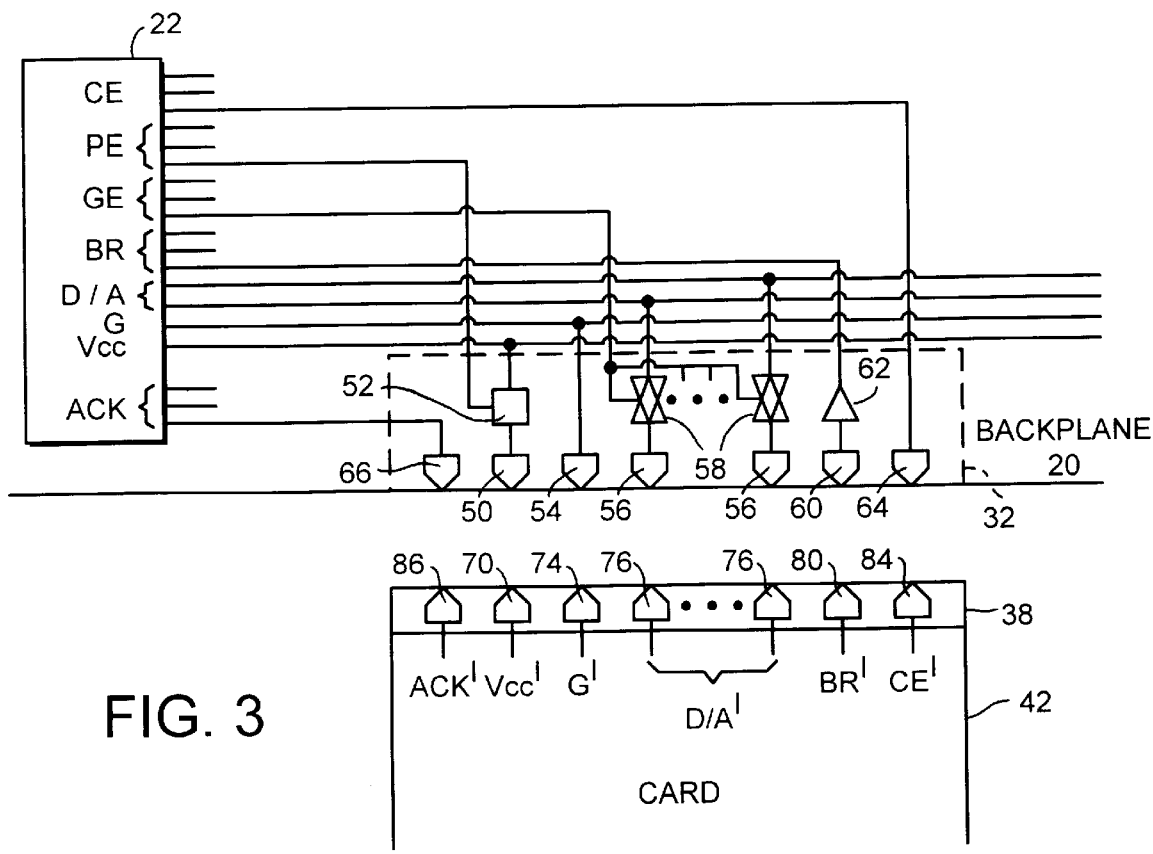
FIG. 3 is a schematic diagram illustrating some of the connections from a bus controller to an insertable card.

The bus 24 shown schematically in FIGS. 1 and 2 comprises many different signal lines. Some of the signal lines of a bus in accordance with the present invention are shown in FIG. 3. Some of the bus signal lines for connection to the insertable cards are required permanently. Such signals include, for example, power and clock signals and output signals such as a bus request signal which needs to be observed permanently. Other signals only need to be observed when a card carries out a data transaction during an appropriate bus cycle, for example data bus signals. An embodiment of the present invention can take account of this.

Figure 4:
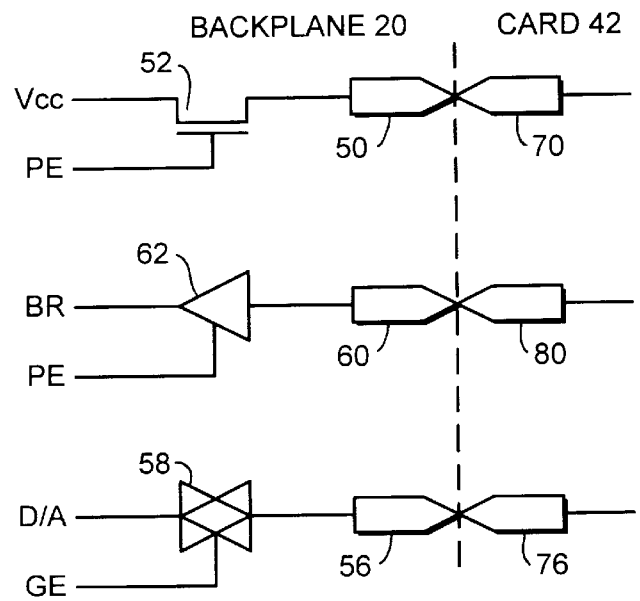
FIG. 4 illustrates in more detail some of the elements of FIG. 3.

In FIG. 3, a number of contacts 50, 54, 56, 70 and 64 in a connector 32 are illustrated schematically. These are for connection to respective contacts on a card 42. FIG. 4 illustrates in more detail selected ones of the contacts shown in FIG. 3.

In particular, contact 50 in the connector 40 on the backplane 20 is connected to a bus line Vcc for supplying a power supply to the power supply contact 70 of an inserted card 42. However, rather than the contact 50 being connected directly to the power supply line Vcc, the connector 40 or the backplane 20 is provided with a switch gate 52 (which is preferably configured as a field effect transistor) which is switched in response to a power enable PE signal also supplied over the backplane 20 from the bus controller 22.

A contact 60 receives a bus request signal BR from a corresponding contact 80 of an inserted card 42. The bus request contact 60 is connected to a bus request line BR to the bus controller 22 via a bus request gate 62 which, as shown in FIG. 4, can be made to be responsive to the power enable signal PE. In this case, the bus request gate 62 can be arranged to provide a delay after receipt of the power enable signal before enabling bus request signals to be passed from the contact 60 to the bus request line BR. The delay is set in order to give sufficient time for the circuitry on the card 42 to stabilise.

The power enable signal PE is supplied for switching the switch 52 and for enabling the delay period to be commenced when it is detected, or the user signals, that the card 42 has been correctly inserted within the connector 32.

Alternatively, and particularly where a greater degree of flexibility is required, it may be preferable to implement the bus request gate 62 as a simple gate operated under software control.

A plurality of connectors 56 for data and address lines are provided. Each of the data/address contacts 56 is connected to a corresponding data/address line D/A on the backplane bus via a respective transmission gate 54. The transmission gates 58 are enabled by a gate enable signal GE, provided from the bus controller 22.

Also shown in FIG. 3 is a ground contact 54 connected to a grounding line and a card enable contact 64 connected to a card enable line CE from the bus controller 22. Corresponding contacts 54 and 84 are provided on the card 42. It will be appreciated that additional contacts can be provided on the connector 32 and on the card 42 for additional signal lines are required by any particular implementation.

Each of the contacts 70, 74, 76, 80 and 84 on the card 42 are connected to printed circuit or other wiring Vcc, G, D/A, BR, CE on the card 42 for connection to the appropriate functional units on that card.

As represented in FIG. 3, the data/address lines D/A are provided in parallel to each of the connectors 30, 32 and 34. Also, the power and ground lines Vcc and G are provided in parallel to the connectors 30, 32 and 34. Separate bus requests, gate enable, power enable and card enable lines are provided to each of the respective connectors 30, 32 and 34.

Figure 5:
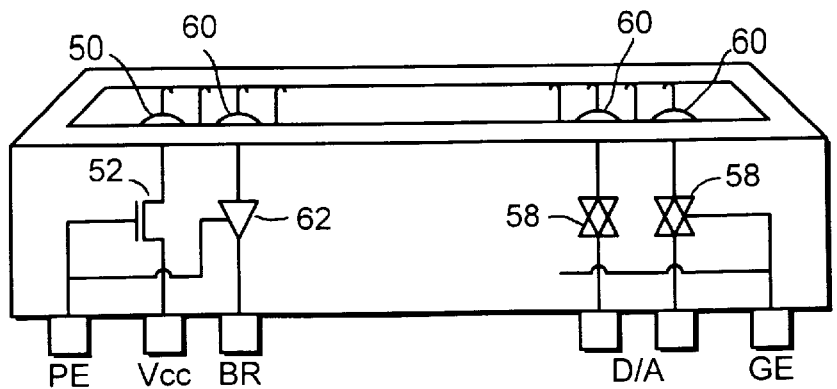
FIG. 5 is a schematic representation of a connector for an expansion card.

FIG. 5 is a schematic representation of a connector for use on a backplane, which connector includes the various gates described with reference to FIG. 4. A switch gate 52 (here a FET) is connected between a Vcc pin and the contact 50. The control signal PE is supplied via a PE pin. The PE signal is also supplied to a delay circuit 62 which is provided between a contact 60 and a pin BR. Also, a plurality of transmission gates 58 are provided in line between data/address contact 60 and D/A pins. The control input for each transmission gate 58 is connected to a GE pin. It will be appreciated that FIG. 5 is merely schematic and only illustrates selected pins. In practice, many more pins would be provided, and the connector may take on any standard or alternative connector configurations.

Although, in a preferred embodiment, at least the switch 52 and the transmission gates 58 would be provided in the connector, in alternative embodiments, other configurations of gates could be provided within the connector, subject to there being at least selected gates connected between critical contacts of the connector and corresponding pins for connection to printed circuit or other wiring on the backplane.

Figure 6:
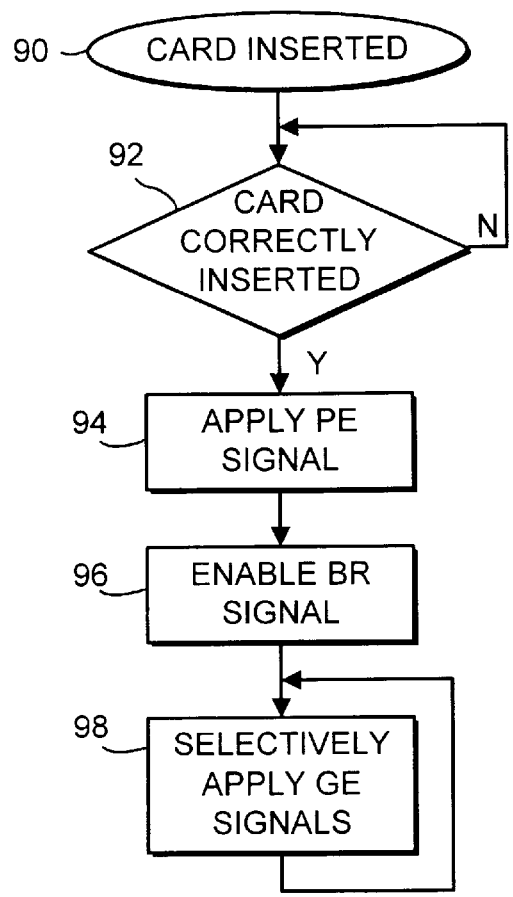
FIG. 6 is a flow diagram illustration hot insertion of a card.

FIG. 6 is a flow diagram for schematically illustrating the selective enabling of the various contacts in the connector 32 when the card 42 is inserted.

The process is initiated by the user inserting the edge connector 38 of the card 42 into the connector 32 on the backplane 20. A mechanism is provided 92 for detecting correct insertion of the card. This could be performed by the user inputting appropriate data into the computer 10 to confirm that the card has been correctly inserted. Alternatively, automatic means could be provided for detecting the correct insertion of the card. Optionally, this could be by sensing a particular signal level at a contact 66, which on insertion of the card 42 makes contact with the further contact 86 on the card, over a line (e.g. an acknowledge line ACK) to the controller 22. As a further alternative, a mechanical sensor could be provided to detect the correct insertion of the card connector 38 in the backplane connector 32. As a further alternative, impedance values on an existing line could be used to detect correct insertion of the card.

Irrespective of the particular method used to detect correct insertion of the card, when this is detected at step 92, a power supply signal PE, is supplied at 94 from the bus controller 22 to the switch 54 for enabling power 50 to be supplied to the card 42. This ensures that power is not supplied until all the appropriate connections have been made.

As illustrated in FIG. 4, the power enable PE signal is also supplied to the delay stage 62 to prevent bus request signals being received by the bus controller 22 from the insert card 42 until circuitry on that card has stabilised. This ensures that spurious bus request signals and/or other spikes are not sent to the bus controller 22.

When the bus request signal line has been enabled in step 96, the card is then fully operational and the power supply, clock and other permanently required signals are available permanently to the card 42. Also, the bus request line from the card is permanently monitored.

However, in preferred embodiment of the present invention, the data/address contacts 56 of the connector 32 are only enabled at appropriate bus cycle times for the card 42 in question, thus providing dynamic cycle switching.

In the preferred embodiment of the invention, two mechanisms are employed by the bus controller 22 for determining when the data/address contacts 56 are enabled for a particular card 42.

The first mechanism is to enable the data/address contacts 56 by supplying a gate enable signal to the appropriate transmissions gates 58 when the card 42 in question when the controller grants the bus to the card in response to the card asserting the bus request line for that card. It will be noted that there is one bus request line on the backplane 20 for each card connector 30, 32, 34 etc. Accordingly, the bus controller 22 knows immediately which card has asserted respective bus request lines, enables the appropriate transmission gates 58 by supplying an appropriate gate enable signal to the card in question at the same time as granting bus access during the appropriate bus cycle.

Figure 7:
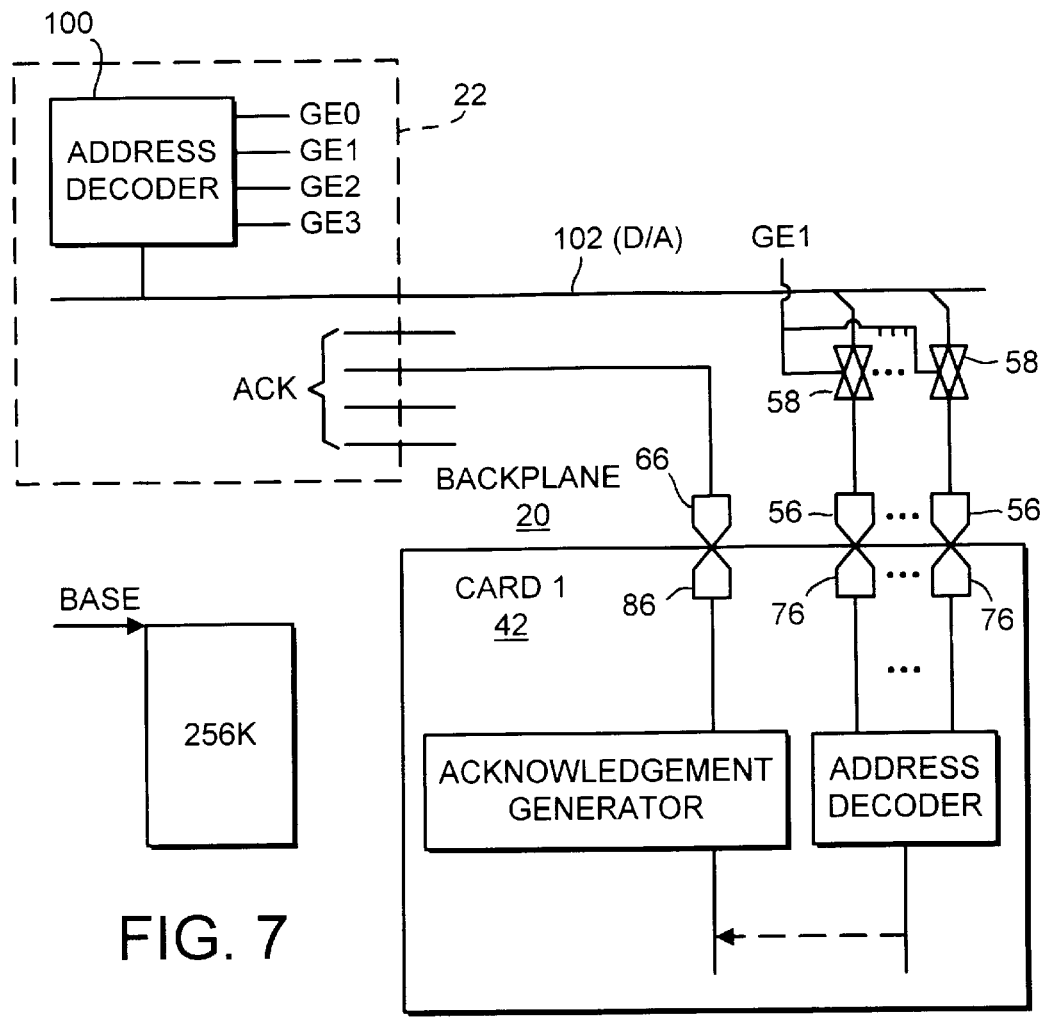
FIG. 7 is a schematic diagram illustrating aspects of geographical addressing.

An alternative mechanism is employed when the card in question is operating in the slave mode under the control of the controller 22. In order that the controller can predict which card is addressed in such a mode, the card controller 22 employs geographic addressing to address the individual cards. This achieved by employing programmable addressing (for example as provided in accordance with the PCI standard). Accordingly, as schematically represented in FIG. 7, the bus controller 22 is provided with an address decoder 100 which is responsive to an address on address lines 102 to generate the gate enable signals GE0–GE3 for (in this case) up to four separate cards (it will be remembered that only three card connectors are shown and therefore only three card enable signals are needed, by way of example, in FIG. 1). The power enable signals and also the card enable signals are preferably provided under software control.

Figure 8:
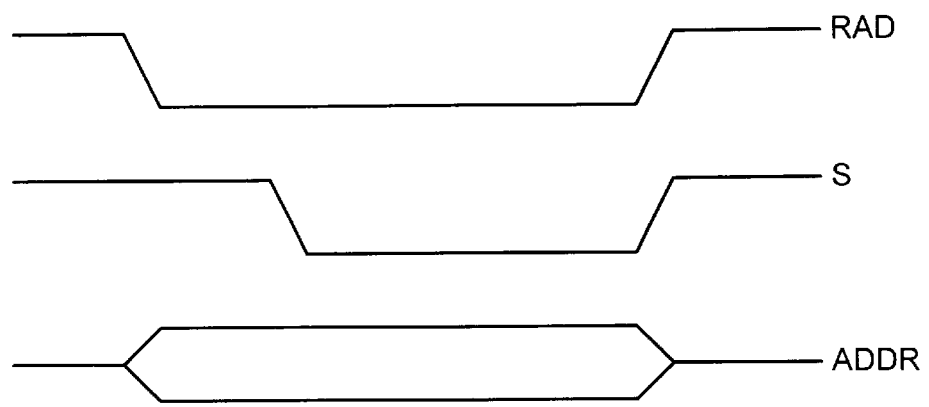
FIG. 8 represents one possible technique for providing signal in one embodiment of the invention.

Although a particular configuration of lines is shown in FIG. 3, it will be appreciated that this is merely one example of a possible line configuration for the backplane bus and the connectors 32/38. Alternative detailed configuration of bus lines can be provided. Also, it is possible for example, to provide the gate enable signals without the provision of separate gate enable lines on the backplane bus. For example, FIG. 8 illustrates the use of a radial address line, RAD, which would be provided separately for each of the individual connectors 32 and a common strobe to determine the timing of the opening of the transmission gates 58. Firstly, although the strobe signals is supplied in common to all the cards, this could be used in combination with the selectively addressed RAD signal to ensure that the transmission gates for a particular card are enabled during the appropriate cycle for that card.

There has been described a bus configuration which can enable hot insertion, fault isolation, and bus expansion for a standard backplane bus by the provision of transmission gates.

An embodiment of the invention can isolate each connector of a bus (for example PCI bus) by the placing of transmission gates (for example configured as field effect transistors) on the backplane between PCI bus connectors. The transmission gates can be provided as an integral component in a connector for the insertion of a backplane card or could be provided on the backplane bus itself.

An embodiment of the invention can enable rapid and reliable fault detection through the use of geographical decoding of the bus addresses whereby the bus controller will know immediately which connector (slot) has a bus connected to it in which a fault has occurred as the bus controller will know in advance which card will respond to any cycle before that cycle issues.

By enabling the transmission gates for only the targeted connector in any bus cycle, the overall effective transmission line over the backplane bus is reduced to the line length on the backplane plus the transmission line length on the selected card. This provides significant transmission line advantages enabling reduced electromagnetic interference, and reliable higher frequency operation.

Also, fault isolation becomes much easier as a fault, for example a short on a bus line bit, will only manifest itself when the transmission gates for the fault card are enabled. It will be appreciated that fault isolation is therefore facilitated.

The additional backplane transistor isolation provided for power supply lines, clocks, etc are a preferred embodiment of the invention, which are enabled when the card is turned on and are kept enabled until it is turned off. In a preferred embodiment of the invention as described herein, a number of advantages are provided.

A) A card is hot insertable as a result of keeping all of the gates turned off while inserting or removing the card.
B) No leading pin connector is required on a card to enable hot insertion as any signal can touch first with the gates turned off.
C) Features A and B together mean that a standard cold insertable PCI card can be used in a hot maintained system.
D) Transmission lines are much shorter as only one PCI slot is enabled at any one time—each individual PCI slot can have quite long bus traces which are isolated by the gates and do not effect the overall system, enabling PCI bus physical lengths which can rise from the usual 0.7 meters limit to about 2 meters, making additional physical system configuration.
E) Where the bus talks to only one slot at a time, faults in that slot cannot effect other slots. Thus a PCI card in an embodiment of the invention can short all other PCI bus lines to ground and yet the other slots will still work perfectly. This enables good fault isolation of a single replaceable module.

Although particular embodiments of the inventions have been described, it will be appreciated that the invention is not limited thereto, and many modifications and/or additions may be made within the spirit and scope of the invention as defined in the appended claims. For example, different combinations of the features of the dependent claims may be combined with the features of the independent claims.

What is claimed is:

1. A method of connecting an expansion card to a backplane including a plurality of connectors in a computer, said backplane further including a plurality of signal lines connected to each of said connectors, the method comprising:

isolating each of said connectors from said signal lines using a plurality of gates controlled by a bus controller;

causing one of said connectors in which said expansion card is inserted to send a correct insertion signal to said bus controller on correct insertion of said expansion card;

causing said bus controller to enable a first gate that allows a power signal to be supplied to said expansion card;

causing said bus controller to enable a second gate that allows said bus controller to receive a bus request signal from said expansion card; and causing said bus controller to enable and disable remaining of said plurality of signal lines in accordance with said bus request signal transmitted by said expansion card applying geographic addressing by said bus controller to a plurality of expansion cards connected to said connectors such that said bus controller can determine in advance a source of a response to any bus cycle before said bus cycle commences.

2. The method of claim 1, further comprising:

delaying by a predetermined period said enabling of said second gate after enabling said first gate.

3. The method of claim 1, further comprising:

enabling said gates connecting said plurality of signal lines to said connector in which said expansion card has transmitted said bus request signal for a given bus cycle; and disabling said gates after said given bus cycle is completed.

4. The method of claim 1, further comprising:

hot inserting said expansion card while said computer is running.

5. The method of claim 1, wherein said bus controller allowing one of said connectors to be connected to said backplane at a given time by enabling said plurality of gates connecting said plurality of signal lines to said connector thereby providing dynamic cycle switching of said connectors.

6. The method of claim 1, wherein said bus controller isolates a faulty expansion card by disabling said plurality of gates connecting said faulty expansion card to said signal lines.

7. An apparatus for connecting an expansion card to a backplane including a plurality of connectors, said backplane further including a plurality of signal lines connected to each of said connectors, said apparatus comprising:

a plurality of gates configured to isolate each of said connectors from said signals;

a bus controller configured to control each of said plurality of gates, said bus controller configured to receive a signal that indicates a correct insertion of said expansion card;

said bus controller configured to enable a first gate that allows a power signal to be supplied to said expansion card;

said bus controller configured to enable a second gate allows said bus controller to receive a bus request signal from said expansion card; and said bus controller configured to enable and disable remaining of said plurality of signal lines in accordance with said bus request signal transmitted by said expansion card an address decoder configured to provide geographic addressing of a plurality of expansion cards connected to said connectors such that said bus controller can determine in advance a source of a response to any bus cycle before said bus cycle commences.

8. The apparatus of claim 7, wherein said second gate is configured to be enabled after a predetermined delay following said first gate being enabled.

9. The apparatus of claim 7, wherein said bus controller configured to enable said gates connecting said plurality of signal lines to said connector in which said expansion card has transmitted said bus request signal a given bus cycle; and said bus controller configured to disable said gates after said given bus cycle is completed.

10. A computer system comprising:

a processor;

a backplane to which said processor is coupled to, said backplane including a plurality of connectors, said backplane further including a plurality of signal lines connected to each of said connectors;

a plurality of gates configured to isolate each of said connectors from said signals;

a bus controller configured to control each of said plurality of gates, said bus controller configured to receive a signal that indicates a correct insertion of said expansion card;

said bus controller configured to enable a first gate that allows a power signal to be supplied to said expansion card;

said bus controller configured to enable a second gate allows said bus controller to receive a bus request signal from aid expansion card; and said bus controller configured to enable and disable remaining of said plurality of signal lines in accordance with said bus request signal transmitted by said expansion card an address decoder configured to provide geographic addressing of a plurality of expansion cards connected to said connectors such that said bus controller can determine in advance a source of a response to any bus cycle before said bus cycle commences.

11. The computer system of claim 10, wherein said second gate is configured to be enabled after a predetermined delay following said first gate being enabled.

12. The computer system of claim 10, wherein said bus controller configured to enable said gates connecting said plurality of signal lines to said connector in which said expansion card has transmitted said bus request signal a given bus cycle; and said bus controller configured to disable said gates after said given bus cycle is completed.

* * * * *